Feb. 13, 1923.
E. P. ELZEY
ANTISKID CHAIN
Filed Apr. 19, 1921
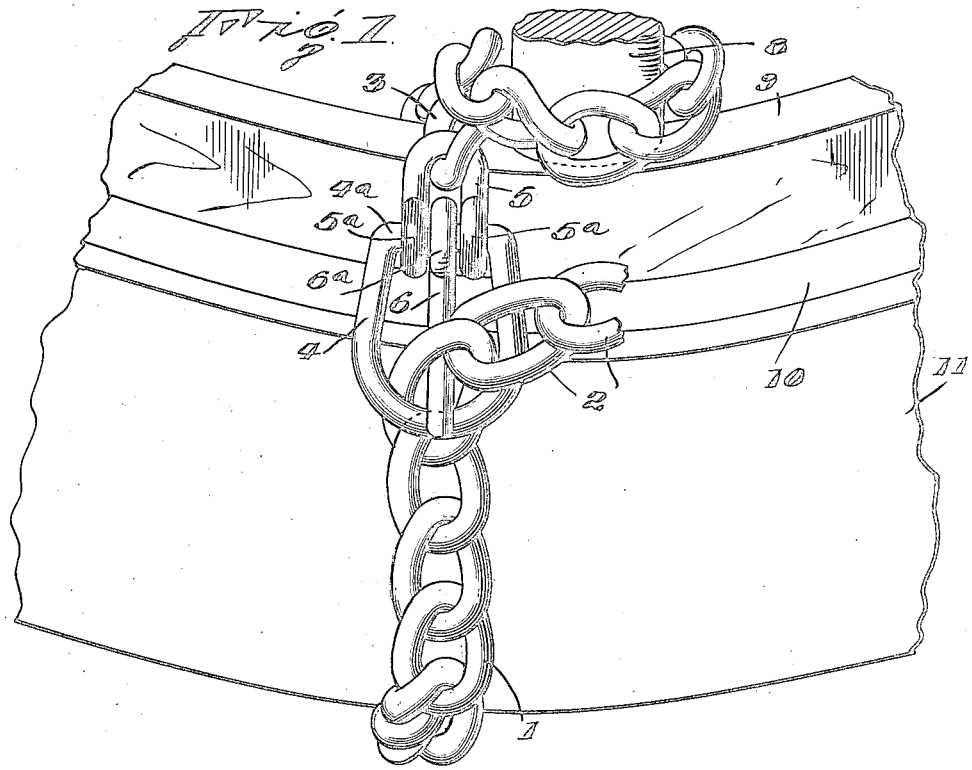
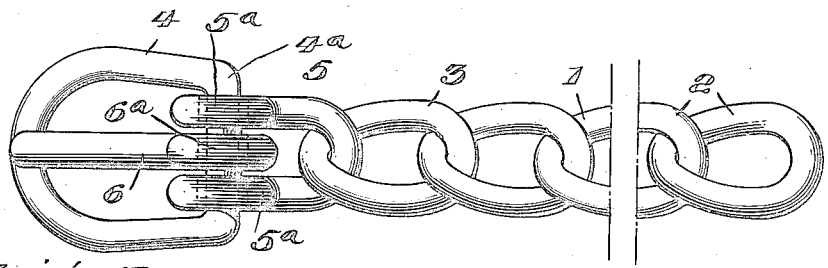
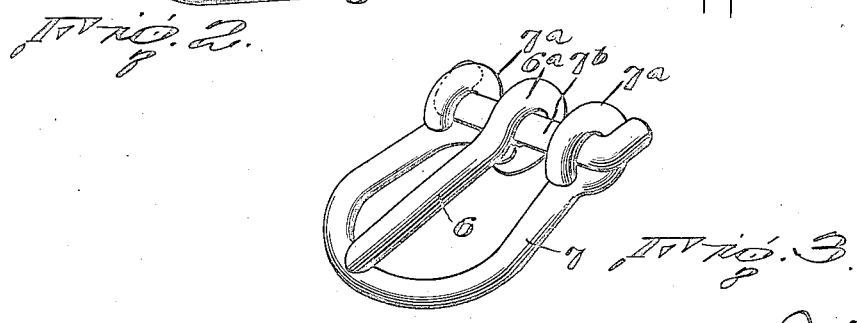
Inventor
Edgar P. Elzey
By
Hubert Peck, Attorney Patented Feb. 13, 1923.

1,445,305

UNITED STATES PATENT OFFICE.

EDGAR P. ELZEY, OF PARKERSBURG, WEST VIRGINIA.

ANTISKID CHAIN.

Application filed April 19, 1921. Serial No. 462,509.

*To all whom it may concern:*

Be it known that I, EDGAR P. ELZEY, a citizen of the United States of America, and resident of Parkersburg, Wood County, State of West Virginia, have invented certain new and useful Improvements in and Relating to Antiskid Chains, of which the following is a specification.

This invention relates to certain improvements in and relating to anti-skid devices for vehicle wheels; and the objects and nature of the invention will be readily understood by those skilled in the art in the light of the following explanation of the accompanying drawings illustrating what I now believe to be the preferred mechanical expression or embodiment of my invention from among other forms, constructions and arrangements within the spirit and scope thereof.

An object of the invention is to provide a quickly and easily attachable and detachable anti-skid device for vehicle wheels that within itself embodies improved means whereby the device can be fastened and released without regard to whatever particular construction may be employed to form the flexible traction or road surface engaging portion of the device.

With this and other objects in view, the invention consists in certain novel features in construction and in combinations and arrangements as more fully and particularly set forth and specified hereinafter.

Referring to the accompanying drawings:

Fig. 1, is a perspective view illustrating an anti-skid device of my invention in operative position fastened on a vehcle wheel.

Fig. 2 is a plan view of the anti-skid device of Fig. 1, detached from the wheel and partially broken away.

Fig. 3, is a detail view of a modified form of end loop and the swingable finger that cooperates therewith in fastening the device on the wheel.

In the particular example illustrated, the anti-skid device consists of a section of chain of sufficient length to extend more or less loosely around the wheel tire and across the wheel rim or felloe with a loop around a spoke, leaving the opposite chain ends of sufficient length to be secured together as hereinafter explained.

However, I do not wish to limit myself to any particular formation or construction for the traction or road engaging portion of the anti-skid device, i. e., the portion of the device that traverses or fits the tire tread, so long as said portion terminates in flexible end connections to provide for fastening as hereinafter set forth. Where the said traction portion is formed by chain links said links can be heavier and stronger than the links of the chain ends to stand the excessive wear to which they are subjected by engagement with the road.

The anti-skid device shown as an example consists of a long section of chain and the traction portion in this example, is formed by an intermediate length 1, of this chain.

One end of this chain is composed of the plain loose open-center links 2. The opposite end of the chain can also be formed of similar loose links 3, but this is not material. This end of the chain terminates in a very strong heavy enlarged loop 4. This loop 4 can be flat as in Figs. 1 and 2, laterally enlarged, and longitudinally elongated with respect to the corresponding dimensions of the links 2 of the other end of the chain. The loop 4 is formed in one integral piece and at one end is formed with straight approximately cylindrical cross bar $4^a$. This loop is coupled to the end link 3 by a strong U-shaped link 5 having the ends of its legs curled to form alined eyes $5^a$ spaced a distance apart and loosely surrounding the end portions of the end bar $4^a$ of loop 4. The loop 4 is longitudinally and approximately-centrally spanned by a usually-straight strong heavy free-end swingable finger 6. At one end, this finger is formed with eye $6^a$ loosely surrounding the loop bar $4^a$ between the eyes $5^a$ of the U-shaped link 5. The free end of the finger overlies the free end of the loop 4 a substantial distance and abuts and rests on the top or outer surface of said free end of the loop. The eye $6^a$ of the finger is enlarged with respect to the external diameter of loop bar $4^a$ so that the finger is loosely confined to said bar to freely swing thereon and to play longitudinally of said bar so far as permitted by the link eyes $5^a$.

If so desired, instead of the one-piece welded or forged loop 4 of Figs. 1 and 2, I can employ a loop such as disclosed by Fig. 3 consisting of a U-shaped body 7 having end eyes $7^a$ surrounding a separate rear bar $7^b$ that has bent ends to confine the bar in the eyes. The eyes $5^a$ of link 5, and the eye of the finger 6 can surround the bar 7ᵇ between eyes 7ᵃ to function as in the construction of Figs. 1 and 2.

The anti-skid device is of such construction and arrangement, as to permit looping a near-end portion of the chain around a spoke 8 (Fig. 1) with the chain plies crossing one over the other beside the spoke, resting on the inner surface of the felloe 9 and extending outwardly of the wheel at opposite side edges of the wheel felloe 9 and rim 10, the chain ends being arranged to meet and overlap at one side edge of the wheel rim or felloe after the chain has been passed around the tire 11.

In applying the chain, the securing-finger-carrying loop 4, is usually held flat against one side of the wheel at the felloe and rim (as in Fig. 1, for instance) with the loop 4 and its finger projecting outwardly toward the adjacent side face of the tire. While the loop is thus held, the chain is passed across the inner face of the felloe, then around the spoke and across the inner face of the felloe to the other side edge of the rim and then outwardly and around the tire so that the free end of the chain composed of links 2 can be brought up beside loop 4. The free end of the chain composed of links 2 is passed under loop 4, (the finger 6 being then elevated) and outwardly through said loop. One of the links 2 is then slipped over the free end of the elevated finger 6 so that when the finger drops to normal position on the loop 4 the chain end composed of links 2 will be locked or fastened to the other chain end that is provided with loop 4. Any desired one of the links 2 can be slipped onto the finger 6, according to the size of wheel tire or form of the felloe and rim or according to the amount of slack desired in the portion of the chain traversing the tire, particularly as it is desirable to allow plenty of slack in the chain.

Notwithstanding the looseness of the chain and its loop 4 and finger 6 when in operative position, it is approximately impossible for the end 2 of the chain to become accidentally detached from the finger. To detach the chain, it is necessary to press or hold the loop 4 down toward the rim 10 (Fig. 1) while drawing the chain end 2 inwardly of the wheel through the loop and the particular link 2 on the finger 6 cannot be then detached from that finger until the finger has swung outwardly such a distance that the next or succeeding link 2 has been pulled approximately half way through the loop 4. The finger 6 can then be swung back out of the way while the loop and chain end 2 are separated. The loop 4 and its attaching link 5, are formed to permit the link to assume its proper operative position lying over or resting against the wheel rim approximately as shown in Fig. 1.

By looping the chain around a wheel spoke with the chain plies crossing beside the spoke and having their ends coupled together at a side of the felloe or rim, I find that the loop around the spoke remains approximately fixed in size without rubbing, biting into and damaging the spoke.

Several of these chains can be coupled together to form a towing chain.

I find that it is desirable to form the finger eye 6ᵃ of large size so that the finger is loose on the end bar 4ᵃ to avoid locking thereof under weather and road conditions.

It is evident that various changes, variations and modifications might be resorted to without departing from the spirit and scope of my invention as defined by the claims, and hence I do not wish to limit myself to the exact disclosures hereof.

What I claim is: —

1. An anti-skid device for vehicle wheels consisting of an elongated section of chain at one end having a loop and a free-end swingable locking finger spanning the loop and at the other end having loose open center links formed to extend through said loop with any one of said links receiving said finger.

2. An anti-skid device for vehicle wheels consisting of a section of chain of a length to extend around the tire and loop around a wheel spoke with its oppositely-extending plies crossing beside the spoke and with its free ends meeting beside the wheel rim or felloe, one end of said chain embodying loose open-center links, the other end of the chain having an end loop, enlarged transversely and longitudinally with respect to said links and formed to overlie the wheel rim or felloe and receive said end links, and a free end swingable finger longitudinally spanning the loop and normally resting thereon, any one of said links formed to slip over the free end of said finger.

3. An anti-skid device for vehicle wheels consisting of a section of chain having an end loop embodying an end bar, a U-shaped link coupling said loop to the chain and having eyes receiving said bar, and a free-end finger longitudinally spanning and normally resting on said loop and at one end having an eye loosely surrounding said bar, the other end of the chain having several loose open-center links formed to pass through said loop and receive said finger.

EDGAR P. ELZEY,